United States Patent [19]

Hara et al.

[11] Patent Number: 4,566,924

[45] Date of Patent: Jan. 28, 1986

[54] METHOD FOR FIXING STUD ON WORKPIECE

[75] Inventors: Kunio Hara, Kawasaki; Toshie Tanaka, Tokyo; Teruji Shibayama, Ohisomachi; Minoru Morisaki, Yokosuka; Yoshio Kaneko, Chigasaki, all of Japan

[73] Assignee: Nifco, Inc., Yokohama, Japan

[21] Appl. No.: 652,070

[22] Filed: Sep. 19, 1984

[30] Foreign Application Priority Data

Sep. 21, 1983 [JP] Japan .................. 58-173231

[51] Int. Cl.⁴ .............................................. B29C 65/06
[52] U.S. Cl. ................................ 156/73.5; 24/90 HA; 156/580; 228/112; 264/68
[58] Field of Search ............ 156/73.5, 580, 73.1; 228/2, 112; 264/68; 24/90 HA

[56] References Cited

U.S. PATENT DOCUMENTS

| | | | |
|---|---|---|---|
| 3,468,732 | 9/1969 | Hewitt | 228/2 |
| 4,250,596 | 2/1981 | Hara et al. | 24/90 HA |
| 4,427,471 | 1/1984 | Chierici | 156/73.5 |
| 4,477,307 | 10/1984 | Cearlock et al. | 156/73.5 |

*Primary Examiner*—Michael Wityshyn
*Attorney, Agent, or Firm*—Schwartz & Weinrieb

[57] ABSTRACT

Fixation of a stud on a workpiece is accomplished by depositing hotmelt adhesive agent on a fitting base of the stud, fastening the stud to a rotary tool, rotating the stud with the fitting base pressed against the workpiece and, after the adhesive agent has been activated to a prescribed extent by the heat of friction, stopping the rotation of the stud and pressing the fitting base against the workpiece.

20 Claims, 11 Drawing Figures

METHOD FOR FIXING STUD ON WORKPIECE

BACKGROUND OF THE INVENTION

1. Field of the Invention

This invention relates to a method for fixing on a workpiece a stud possessing a fitting base at one end of the shank thereof by securing the fitting base on the workpiece by the use of a hotmelt adhesive agent.

2. Description of Prior Art

For the fitting base of a stud to be secured on a metal plate with a hotmelt adhesive agent, it is necessary to tack the fitting base to the metal plate with the aid of the hotmelt adhesive agent, fuse or activate the hotmelt adhesive agent as by placing the stud so tacked to the metal plate in an oven, remove the stud and the metal plate from the oven, and leave the molten hotmelt adhesive agent to cool and cure. When the workpiece on which the stud is fixed happens to be a wooden panel or a board of hardened aggregate of fibers, for example, the procedure just described cannot be adopted because the workpiece may catch fire in the oven.

It has been found that when a plastic stud set in place with the shank thereof fastened to the chuck of a rotary tool and the fitting base thereof pressed against a workpiece is rotated at a fairly high speed, the opposed faces of the workpiece and the fitting base generate heat because of friction and, depending on the material of the workpiece, the opposed faces of both the workpiece and the fitting base or only the face of the fitting base held in contact with the face of the workpiece is melted sufficiently to cause fusion of the workpiece and the fitting base. A method for direct fixation of the stud on the workpiece by the use of the principle described above has been proposed (Japanese Patent Application No. SHO 58(1983)-135712).

OBJECT OF THE INVENTION

An object of this invention is to provide a method for easy fixation of a plastic stud not only on a workpiece made of metal or plastic material but also on a workpiece made of wood, fiber board, corrugated cardboard, or ceramic which has heretofore defied attachment of a plastic stud.

SUMMARY OF THE INVENTION

As the result of a further study on the aforementioned prior invention, it has been found that the heat of friction generated at the contact faces of the workpiece and the stud can be utilized for the activation of a hotmelt adhesive agent. This knowledge has led to perfection of this invention. Specifically, the present invention is directed to a method for fixing a stud on a workpiece by causing the opposed faces of the fitting base of the stud and the workpiece to retain the hotmelt adhesive agent as applied thereon and, with the fitting base pressed against the workpiece, rotating the stud at a fairly high speed thereby melting the hotmelt adhesive agent with the heat of friction consequently generated and securing the stud on the workpiece.

Since the fixation by this invention can be attained by the use of the hotmelt adhesive agent without recourse to an oven, the workpiece on which the stud is to be fixed may be made of not only metal or plastic material but also wood, fiber board, ceramic, or corrugated cardboard paper which has heretofore defied attachment of a stud. Moreover, with the method of this invention the operation of tacking the stud to the workpiece which heretofore has been required before the applied hotmelt adhesive agent is thermally heated in an oven is no longer necessary.

BRIEF DESCRIPTION OF THE DRAWINGS

The other objects and characteristic features of the present invention will become apparent to those skilled in the art as the disclosure is made in the following description of preferred embodiments of the invention, as illustrated in the accompanying drawings.

DESCRIPTION OF PREFERRED EMBODIMENTS

Figure 1A:
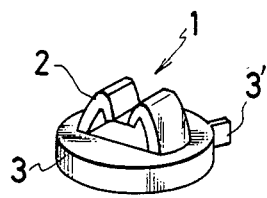
FIG. 1(A) is a perspective view illustrating, as the first embodiment, a plastic stud to be fixed on a workpiece in accordance with the present invention.
Figure 1B:
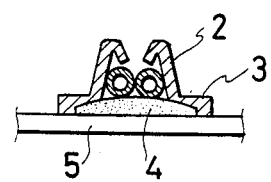
FIG. 1(B) is a cross section illustrating the stud of FIG. 1(A) in a state used as fixed on a workpiece.

FIGS. 1(A)–3(A) illustrate plastic studs 1 to be fixed by the present invention. Each of these plastic studs 1 possesses a shank 2 and a fitting base 3 provided as a seat at one end of the shank 2 thereof. FIGS. 1(B)–3(B) illustrate the aforementioned studs in the state used as fixed with their respective fitting bases 3 secured on workpiece 5 made of metal plate, wood, fiber board, plastic, or any other desired material through the medium of hotmelt adhesive agent 4 in an activated state.

Figure 2A:
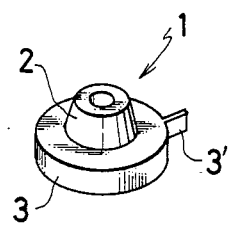
FIG. 2(A) is a perspective view illustrating, as the second embodiment, a plastic stud.
Figure 2B:
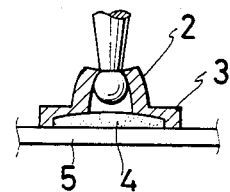
FIG. 2(B) is a cross section illustrating the stud of FIG. 2(A) in the state used as fixed on a workpiece.
Figure 3A:
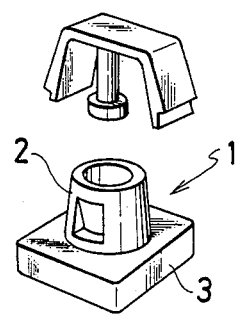
FIG. 3(A) is a perspective view illustrating, as a third embodiment, a plastic stud.
Figure 3B:
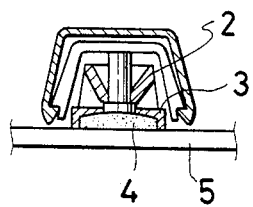
FIG. 3(B) is a cross section illustrating the stud of FIG. 3(A) in the state used as fixed on a workpiece.

The shanks 2 of the studs of these figures are such that the shank of FIG. 1 can be utilized for retaining an electric cable or some other wire material, that of FIG. 2 for swingably retaining the ball of a ball joint, and that of FIG. 3 for retaining a clip serving to attach a molding to the exterior of an automobile body. The shank 2 of the stud is of course not limited to those examples mentioned above but may be in a form usable for any other desired application. The fitting base 3, instead of being circular, may be polygonal or any other desired shape.

Figure 4:
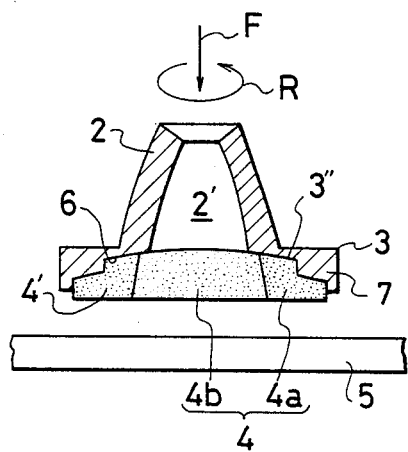
FIG. 4 is a magnified cross section of the stud of FIG. 2(A).

FIG. 4 is a magnified cross section of the stud illustrated in FIG. 2(A). The fitting base 3 of this stud is provided with a recess 6 on the lower side thereof. Inside this recess 6, the stud retains hotmelt adhesive agent 4. This recess 6 communicates with the lower end of a hollow part 2' of the shank. The hotmelt adhesive agent can be deposited within the recess through the lower side of the fitting base. When the hollow part 2' of the shank forms a through hole opening into the upper end of the shank, the deposition can be effected by inserting an adhesive filling nozzle downwardly through the hollow part and enabling the adhesive agent projected through the nozzle to reach the surface of the recess.

The lower surface 4' of the adhesive agent 4 retained in the recess may be flush with or slightly lower than the lower surface of the fitting base so that the lower surface of the adhesive agent will come into direct contact with the surface of the workpiece when the stud is pressed against the workpiece.

The fixation of the stud 1 is effected with a portable rotary tool or a stationary rotary tool such as a driller by fastening the shank 2 to the chuck of the tool (not shown), pressing the lower surface of the fitting base against the workpiece 5 (as indicated by the arrow F in FIG. 4), and rotating the stud at a fairly high speed in a desired direction (as indicated by the arrow R in FIG. 4). Consequently, the opposed faces of the hotmelt adhesive agent and the workpiece generate heat owing to the friction therebetween and the hotmelt adhesive agent 4 within the recess is melted and activated by the heat so generated and, consequently, enabled to manifest adhesive strength. As the adhesive strength grows in intensity, the stud offers increasing resistance to the rotating force of the tool and the load on the tool increases.

The rotary tool can be stopped, therefore, by using a torque limiter which is adapted to detect the rise in the load so applied on the rotary tool in terms of the increase in the electric current consumed by the tool and discontinue the flow of the electric current to the tool when the load has reached a predetermined value. Otherwise, a projected portion 3' may be formed on the fitting base 3 as thrust out radially therefrom (as shown in FIGS. 1(A) and 2(A) so that the rotary tool will rotate the stud 1 while urging the projected portion 3' and, when the stud adheres to the workpiece, the tool will sense the completion of the adhesion by breaking the projected portion 3' and will come to a stop.

When the adhesive agent is retained inside the recess 6 as illustrated, an outer wall 7 encircling the recess 6 prevents the molten adhesive agent from being scattered by centrifugal force. The stud thus fixed on the workpiece, therefore, suffers from neither impairment of appearance nor loss of the adhesive agent contributing to the fixation due to scattering or consequent loss of adhesive strength. When the upper face of the recess 6 is raised at the center as illustrated, any excess of the adhesive agent melted by the heat of friction will collect at the centrally raised portion. Further, when the blind or through hollow part 2' of the shank communicates with the centrally raised portion as illustrated, the air entrapped in the adhesive agent while the adhesive agent is deposited inside the fitting base, the water the adhesive agent absorbs during storage, the air bubbles generated when the adhesive agent is melted during the fixation, and the aforementioned excess of the molten adhesive agent are able to escape into the hollow part of the shank. If such air bubbles or water droplets persist in the solidified adhesive agent, they may disrupt the cohesion of the adhesive agent and notably degrade the adhesive strength. The stud fixed by this invention, therefore, is free from degradation of adhesive strength because such air bubbles and water droplets are allowed to escape into the hollow part of the shank.

Further, the fitting base may be wholly formed in small thickness to acquire desired flexibility. Otherwise, the central part 3" of the fitting base continuing to the shank 2 may be given a smaller wall thickness than the surrounding parts as illustrated in FIG. 4 so that, when the fitting base is pressed against the surface of the workpiece during the fixation, the lower surface of the adhesive can be pressed substantially over its entire area onto the workpiece and the heat of friction is allowed to generate uniformly and the fusion of the stud and the workpiece is allowed to occur uniformly. Even if the workpiece or its surface happens to be irregular, wavy, or bent to a moderate extent, the fitting base is allowed to conform intimately to the surface and adhere fast thereto.

With a polyamide type hotmelt adhesive agent, studs molded of polyamide resin and polycarbonate resin were set in place with their fitting bases pressed with a force of 50 kg/$\pi$ cm$^2$ against uncoated surfaces of SPCC plates and surfaces of SPCC plates coated with baked melamine resin and rotated at 2500 rpm at room temperature until adhesion occurred. The studs thus fixed on the plates showed the following tensile adhesive strengths. The time required for the adhesion, namely the interval between the time the rotation was started and the time the adhesion was completed was 1.5 to 2.0 seconds.

|  | Uncoated Surface of SPCC Plate | Surface of SPCC Plate Coated with Baked Melamine Resin |
| --- | --- | --- |
| Stud Molded of Polyamide Resin | 50–62 kg/$\pi$ cm$^2$ | 40–52 kg/$\pi$ cm$^2$ |
| Stud Molded of Polycarbonate Resin | 40–65 kg/$\pi$ cm$^2$ | 30–35 kg/$\pi$ cm$^2$ |

Hotmelt adhesive agents come in polyamide type and olefin types. Probably depending on the kind of the hotmelt adhesive agent, the temperature at which the adhesive agent is deposited on the fitting base of the stud affects to some extent the tensile adhesive strength the stud exhibits after it has been fixed on the workpiece. Generally, the tensile adhesive strength is larger when the temperature is on the higher side around 210° C., for example, than when it is on the lower side around 170° C., for example.

The tensile adhesive strength improves when fine powder of glass fiber or carbon fiber is contained at 10 to 15 wt% in the hotmelt adhesive agent. This is because the powder increases the resistance to motion during the rotation and, as a result, the hotmelt adhesive agent is heated to its melting point more quickly and further because, in the case of glass fiber, the hotmelt adhesive agent is protected against breakage by tension. It is, therefore, desirable, to add to the hotmelt adhesive agent the aforementioned powder of glass fiber or carbon fiber as a modifier which has low enough thermal conductivity and high enough heat-transfer efficiency to avoid absorbing the heat of friction generated by the adhesive agent and effects ready transfer of the heat of its own frictional resistance to the adhesive agent. When this modifier is added to the hotmelt adhesive agent, the viscosity of the adhesive agent becomes higher so that the adhesive agent offers greater resistance to rotation than when the addition is not made. Thus, the content of the modifier in the adhesive agent must be selected to best suit the particular kind of hotmelt adhesive agent used.

Hotmelt adhesive agent comes in two types: the high-temperature type which produces a cured adhesive joint vulnerable to low temperatures and resistant to high temperatures and the low-temperature type which produces a cured adhesive joint vulnerable to high temperatures and resistant to low temperatures. The high-temperature type has a high melting point and the low-temperature type a low melting point. It has been found that when the aforementioned powder of glass fiber is added as a modifier to the low-temperature type hotmelt adhesive agent, the characteristics in the high-temperature zone are notably improved without sacrificing the characteristics in the low-temperature zone. This means that the low-temperature type hotmelt adhesive agent can be made to possess satisfactory adhesive strength over a wide range of temperatures. Thus, the hotmelt adhesive agent optimum for use in the present invention can be obtained.

Figure 5:
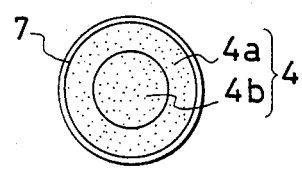
FIG. 5 is a front view of the stud of FIG. 2(A).

Since the hotmelt adhesive agent is available in the two types, that is, the low-temperature type and the high-temperature type as described above, when the hotmelt adhesive agent is deposited in the fitting base, the high-temperature type hotmelt adhesive agent 4a may be disposed around the outer circumferential part which travels at a higher speed during rotation and the low-temperature type hotmelt adhesive agent 4b may be deposited around the inner circumferential part as illustrated in FIG. 5.

Further, when the lower surface 4' of the adhesive agent is allowed to project slightly downwardly from the lower surface of the fitting base, the portion of the adhesive agent protruding downwardly from the lower surface of the fitting base melts in a greater amount and, at the same time, evolves air bubbles while the stud is being rotated for adhesion. The air bubbles find their way through the gap between the lower surface of the fitting base and the workpiece, depart from the periphery of the fitting base, and allow the resultant adhesive joint to acquire an increased adhesive density and enhanced adhesive strength.

Figure 6:
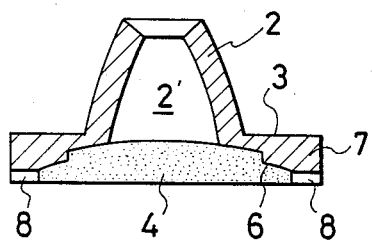
FIG. 6 is a cross section illustrating, as another embodiment, a modification of the stud of FIG. 4.

In contrast when the lower surface of the adhesive agent is flush with the lower surface of the fitting base, the two lower surfaces of the adhesive agent and the fitting base rotate simultaneously as pressed against the surface of the workpiece. Thus, the air bubbles which are evolved in the molten adhesive agent cannot be released from the periphery of the fitting base. Of course, they may escape into the hollow part 2' of the shank as described above when the hollow part 2' communicates with the recess. Even this escape is not allowed when the hollow part is absent. If the air bubbles persist in the molten adhesive agent, they can disrupt the cohesion of the adhesive agent, whereby the resultant adhesive joint suffers from insufficient adhesive strength. To preclude this trouble, the length in the radial direction of the outer wall 7 encircling the recess 6 is increased and one or more slits 8 are incised across the outer wall 7 as illustrated in FIG. 6 so that part of the adhesive agent melted during the fixation will be led into the slits by centrifugal force and, at the same time, the air bubbles evolved from the molten adhesive agent will be released through the slits into the ambient air. The length in the radial direction of the slits is selected so that the molten adhesive agent entering these slits will not flow out of them and soil the surrounding area.

Further when the lower surfaces of the adhesive agent and the fitting base fall flush with each other, since the fitting base is rotated during the fixation as pressed against the surface of the workpiece, it is gradually abraded upwardly and, consequently, the adhesive agent is melted as continuously brought into downward contact with the surface of the workpiece. In this case, the thickness of the lower end part 7' of the outer wall 7 of the recess 6 may be decreased so much as to accelerate the wear of the fitting base up to a certain height from the lower end. In this case, the adhesive agent is melted quickly during the fixation. When the height of the lower end part 7' is suitably selected so that the adhesion of the stud to the workpiece is completed by the time the lower end part 7' is abraded, the height from the upper surface of the workpiece to the upper surface of the fitting base fixed thereon will be the same among all studs fixed, with the result that the positions in the vertical direction of all points of the shanks will also be the same.

Figure 7:
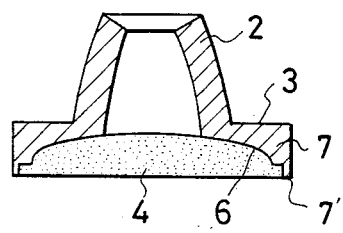
FIG. 7 is a cross section illustrating as another embodiment, a further modification of the stud of FIG. 4.
Figure 8:
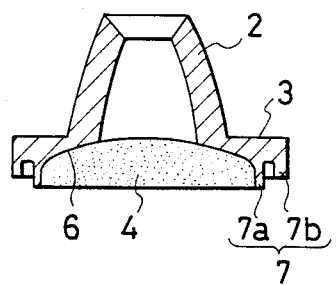
FIG. 8 is a cross section illustrating, as yet another embodiment, a still further modification of the stud of FIG. 4.

In the embodiment of FIG. 8, the outer wall 7 of the recess 6 is formed with an inner side wall 7a having a small wall thickness and a downwarly increased length and an outer side wall 7b having a larger wall thickness and a smaller downward length and disposed at a fixed distance outwardly from the inner side wall 7a, and the lower surface of the adhesive agent and that of the inner side wall 7a fall flush with each other. Similar to the embodiment of FIG. 7, the inner side wall 7a is abraded quickly and the adhesive agent is melted quickly and the adhesion is completed as the lower end of the outer side wall is brought into contact with the surface of the workpiece to prevent otherwise possible variation among the positions in the vertical direction of all points of the shanks of different studs. Moreover, the outer side wall serves the purpose of neatly concealing part of the adhesive agent forced out of the inner side wall and the burr produced when chips torn off the inner side wall deposit on the adhesive agent which oozes out.

The present invention has been described with reference to the illustrated embodiments but is not limited thereto. This invention has the outstanding characteristic that in accordance with the technical idea set forth in the claim, studs of varying construction can be easily fixed on workpieces of varying materials by causing hotmelt adhesive agent to be melted or activated with the heat of friction generated between the adhesive agent and the workpiece.

Obviously, many modifications and variations of the present invention are possible in light of the above teachings. It is therefore to be understood that within the scope of the appended claims, the present invention may be practiced otherwise than as specifically described herein.

What is claimed is:

1. A method for fixing a first member upon a second member, comprising the steps of:

depositing hot-melt adhesive upon one surface of said first member to be bonded to one surface of said second member;

mounting said first member within a rotary tool for imparting relatively high-speed rotation to said first member;

moving said one surface of said first member, and said hot-melt adhesive deposited thereon, toward said one surface of said second member so as to contact said one surface of said second member with said hot-melt adhesive;

activating said rotary tool so as to rotate said first member and said hot-melt adhesive relative to said second member whereby only said hot-melt adhesive will be activated by means of the heat of friction generated between said hot-melt adhesive and said second member; and stopping the rotation of said rotary tool and said first member after said activation of said hot-melt adhesive has attained a predetermined degree whereby said first member is able to be securely bonded to said second member by means of said activated hot-melt adhesive.

2. A method according to claim 1, wherein said hot-melt adhesive agent is one member selected from the group consisting of polyamide type and olefin type adhesive agents.

3. A method according to claim 1, wherein said hot-melt adhesive agent contains glass fibers.

4. A method as set forth in claim 1, wherein:
said second member comprises a workpiece fabricated from either metal, wood, fiber board, or plastic material.

5. A method as set forth in claim 1, wherein:
said rotation of said rotary tool is stopped upon detection of a predetermined amount of torque generated as a result of said activation of said hot-melt adhesive.

6. A method as set forth in claim 1, wherein:
said first member comprises a stud having a shank and a fitting base formed at one end of said shank; and
said one surface of said first member upon which said hot-melt adhesive is deposited is an end surface of said fitting base.

7. A method according to claim 6, wherein a high-temperature type adhesive material is disposed in the outer circumferential part of the end surface of said fitting base and a low-temperature type adhesive material is disposed in the inner circumferential part thereof.

8. A method as set forth in claim 6, wherein:
said fitting base is provided with a projection; and
said rotation of said rotary tool is stopped upon breakage of said fitting base projection indicating the generation of a predetermined amount of torque as a result of said activation of said hot-melt adhesive.

9. A method according to claim 6, wherein said fitting base of said stud is provided with a recess on the end surface thereof and said hotmelt adhesive agent is deposited in said recess.

10. A method according to claim 9, wherein said shank of said stud is provided with a blind hollow part and said blind hollow part communicates with said recess.

11. A method according to claim 9, wherein said shank of said stud is provided with a through hollow part and said through hollow part communicates with said recess.

12. A system for fixing a first member upon a second member, comprising:
a first member fabricated from a first material;
a second member fabricated from a second material;
said first and second members each having a surface by which said first and second members are to be bonded together;
hot melt adhesive means, disposed upon said surface of said first member, for bonding said surface of said first member to said surface of said second member; and
means defined upon said first member for permitting said first member to be mounted within a rotary tool for rotating said first member, and said hot melt adhesive disposed thereon, at a relatively high rate of speed relative to said second member so as to generate frictional heat, as a result of said hot-melt adhesive being disposed in contact with said surface of said second member, for activating only said hot melt adhesive whereby said surfaces of said first and second members are able to be bonded together by said activated hot melt adhesive.

13. A system as set forth in claim 12, wherein:
said materials comprising said first and second members are the same.

14. A system as set forth in claim 13, wherein:
said same material is plastic.

15. A system as set forth in claim 12, wherein:
said first member is fabricated from a plastic material; and
said second member is fabricated from either metal, wood, fiberboard, or plastic material.

16. A system as set forth in claim 12, further comprising:
recess means formed within said first member for housing said hot-melt adhesive.

17. A system as set forth in claim 16, further comprising:
radially oriented slit means, defined within said first member portion forming said recess means, for pemitting the escape of air bubbles from said hot-melt adhesive as said hot-melt adhesive is activated.

18. A system as set forth in claim 16, further comprising:
axially extending, peripherally defined abradable means for defining said recess means for said hot-melt adhesive within said first member for confining said hot-melt adhesive while said hot-melt adhesive is being activated yet being sufficiently abraded upon completion of said activation of said hot-melt adhesive so as to permit said first member surface to be bonded to said second member surface by said activated hot-melt adhesive.

19. A system as set forth in claim 12, wherein:
said hot-melt adhesive is one member selected from the group consisting of polyamide and olefin type adhesives.

20. A system as set forth in claim 12, further comprising:
frangible projection means disposed upon said first member for breakage by said rotary tool upon the development of a predetermined degree of torque as a result of said activation of said hot-melt adhesive.

* * * * *